ANALOGUE COMPUTER FOR SOLVING SIMULTANEOUS EQUATIONS UTILIZING TRANSFORMERS WITH INTERLEAVED WINDINGS

Filed March 1, 1954

INVENTOR.
DAVID C. EVANS

BY Ellsworth R. Roston

ATTORNEY

INVENTOR.
DAVID C. EVANS
BY
Ellsworth R. Roston
ATTORNEY

INVENTOR.
DAVID C. EVANS
BY
Ellsworth R. Roston
ATTORNEY

INVENTOR.
DAVID C. EVANS
BY
Ellsworth R. Roston
ATTORNEY

Feb. 17, 1959 D. C. EVANS 2,873,915

ANALOGUE COMPUTER FOR SOLVING SIMULTANEOUS EQUATIONS UTILIZING TRANSFORMERS WITH INTERLEAVED WINDINGS

Filed March 1, 1954 7 Sheets-Sheet 5

INVENTOR.
DAVID C. EVANS

BY Ellsworth R. Roston

ATTORNEY

INVENTOR.
DAVID C. EVANS
BY
Ellsworth R. Roston
ATTORNEY

Feb. 17, 1959 D. C. EVANS 2,873,915

ANALOGUE COMPUTER FOR SOLVING SIMULTANEOUS EQUATIONS UTILIZING TRANSFORMERS WITH INTERLEAVED WINDINGS

Filed March 1, 1954 7 Sheets-Sheet 7

INVENTOR.
DAVID C. EVANS
BY
Ellsworth R. Roston
ATTORNEY

United States Patent Office 2,873,915

Patented Feb. 17, 1959

2,873,915

ANALOGUE COMPUTER FOR SOLVING SIMULTANEOUS EQUATIONS UTILIZING TRANSFORMERS WITH INTERLEAVED WINDINGS

David C. Evans, Los Angeles, Calif., assignor to The University of Utah, Salt Lake City, Utah Application March 1, 1954, Serial No. 413,059

5 Claims. (Cl. 235—180)

This invention relates to apparatus for solving mathematical equations and more particularly to an electrical system for solving simultaneous linear and secular equations.

In this age of advanced physical concepts, complex equations are often formulated to represent different physical phenomena. These equations are formulated in many fields such as aerodynamics, nuclear energy and electronics. Many of these equations are of the simultaneous type in which values are determined for a plurality of unknown quantities to satisfy the relationships expressed in a number of different equations. The number of simultaneous equations requiring solution may often be as high as 10 and sometimes considerably higher.

When the number of simultaneous equations requiring solution is relatively high, a considerable amount of time is often required by skilled mathematicians to mentally obtain the solution. For example, several days may be required to solve a set of 10 or more simultaneous equations. Several attempts have been made in the past to build machines for solving such equations but none of these attempts have been entirely successful.

This invention provides an analogue machine for solving simultaneous linear and secular equations in a relatively short time. The machine obtains the solution of these equations by utilizing alternating voltages and by varying the alternating voltages produced across adjustable impedances such as potentiometers. The various potentiometers are adjusted in value to minimize an error signal which is produced by the machine. By using potentiometers, and introducing alternating voltages to the potentiometers sensitivity in response and stability in operation are achieved. In this way, relatively accurate values can be determined for the different unknown quantities in the simultaneous equations.

An object of this invention is to provide an analogue computer for solving sets of simultaneous linear and secular equations.

Another object is to provide a computer of the above character which utilizes alternating voltages and which introduces the alternating voltages to a plurality of potentiometers to provide sensitivity of response and stability in operation.

A further object is to provide an analogue computer of the above character in which the different potentiometers can be adjusted in a minimum amount of time to their proper values for an accurate solution of a set of simultaneous equations.

Still another object is to provide an analogue computer of the above character utilizing a novel switching system to insure proper operation of the computer for the solution of a set of simultaneous equations.

A still further object is to provide a system which is relatively simple in construction and operation.

Other objects and advantages will be apparent from a detailed description of the invention and from the appended drawings and claims.

In one embodiment of the invention, a source 10 (Figure 1) is adapted to provide alternating voltage having a frequency of 60 cycles and an amplitude of 115 volts. The movable contact of a manually operated switch 12 is connected to the source and the stationary contact of the switch is connected to one terminal of an autotransformer 14. A connection is made from the other terminal of the autotransformer 14 to the voltage source 10.

Figure 13:
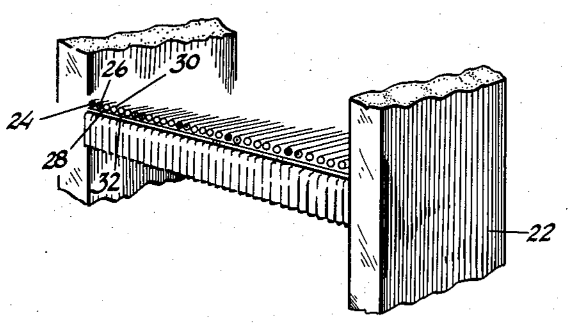
Figure 13 is a perspective view illustrating the construction of a particular transformer shown in Figure 1.

The autotransformer 14 in effect has a secondary produced between a movable contact and the terminal connected directly to the source 10. A capacitance 16 and the primary winding 18 of a transformer generally indicated at 20 (Figures 1 and 13) are connected in parallel with each other and with the secondary of the autotransformer 14. The transformer 20 has an iron core 22 (Figures 1 and 13) generally known as an H-type core because of its configuration. The center leg of the core 22 may have a cross section of approximately 2" x 4" and a length of approximately 5¾".

A plurality of secondary windings such as windings 24, 26, 28, 30 and 32 are wound on the center leg of the core 22. For example, 13 secondary windings may be wound on the center leg of the core. Each secondary winding may be formed from six turns of number 26 wire which are interleaved with the turns of the other secondary windings by laying 13 wires in parallel and winding them in a single layer on the primary winding.

The secondary winding 24 is connected to the movable contacts of a double-pole, double-throw switch 34 having a first set of stationary contacts cross-connected to a second pair of stationary contacts. An L-pad formed from first and second potentiometers 36 and 38 is connected to one of the stationary contacts in each pair in the switch 34. The potentiometers 36 and 38 are in series with each other and are ganged in such a way that the effective value of the potentiometer 36 in the circuit decreases as the effective value of the potentiometer 38 in the circuit increases and vice versa.

One of the stationary contacts in a potentiometer 40 is connected to the potentiometer 36, and the other stationary contact of the potentiometer 40 is connected to the second stationary contact in each pair in the switch 34. A resistance is connected to the common terminal between the potentiometers 36 and 38. The common terminal between the potentiometers 36 and 38 is also connected to one contact of a jack 46, which is adapted to engage the other contact in the jack upon insertion into the jack of a plug schematically illustrated at 48 in the upper right portion of Figure 1. The secondary winding 24, the switch 34, the potentiometers 36, 38, 40 and 44 form an impedance network generally indicated at 50.

Connections are made from the movable contact of the potentiometer 40 to one of the movable contacts in a double-pole, double-throw switch 52 and from the resistance 44 to the other movable contact in the switch. The switch 52 is similar to the switch 34 in that it has two pairs of cross-connected stationary contacts. One of the stationary contacts in each pair in the switch 52 is connected to a grounded resistance 54. The other stationary contact in each pair is connected to one stationary contact of a rheostat 56 having its movable contact connected to the other stationary contact.

The rheostat 56 is in series with a potentiometer 58 and with a rheostat 60 similar in construction to the rheostat 56. One of the stationary contacts of the rheostat 60 is grounded. The rheostats 56 and 60 are ganged such that the effective value of the rheostat 56 increases as the effective value of the rheostat 60 decreases and vice versa. The movable contact of the potentiometer 58 has a common terminal with a first contact of a jack 64, the other contact of which is adapted to engage the first contact of the jack upon insertion of the plug 48 into the jack. The switch 52, the resistance 54, the potentiometer 58 and the rheostats 56 and 60 form an impedance network generally indicated at 66.

The movable contacts of a double-pole, double-throw switch 68 are connected in parallel with the movable contacts of the switch 52. A resistance 70, rheostats 72 and 74 and a potentiometer 76 are associated with the switch 68 in a manner similar to the association of the resistance 54, the rheostats 56 and 60 and the potentiometer 58 with the switch 52. The switch 68, the resistance 70, the rheostats 72 and 74 and the potentiometer 76 form an impedance network generally indicated at 78. A first contact of a jack 79 has a common terminal with the movable contact of the potentiometer 76 and engages the other contact of the jack upon insertion of the plug 48 into the jack.

Just as the winding 24 is associated with various other components to form the impedance network 50, the winding 26 is associated with other components to form an impedance network generally indicated at 80. The various components in the impedance network 80 correspond in construction and electrical interconnections to the components in the network 50. The characteristics of the impedance network 80 are adapted to be measured upon the insertion of the plug 48 into a jack 82.

The output from the impedance network 80 passes to an impedance network generally indicated at 84. The impedance network 84 corresponds to the network 66 and has components similar in construction and electrical interconnection to the components in the network 66. The characteristics of the network 84 may be determined by inserting the plug 48 into a jack 86 corresponding to the jack 64.

An impedance network generally indicated at 88 is in parallel with the impedance network 84. The impedance network 88 has various components constructed and electrically arranged in a manner similar to different components in the network 70. The characteristics of a network 88 are adapted to be measured when the plug 48 is inserted into a jack 90 corresponding to the jacks disclosed above.

The output from the impedance network 50 is not only introduced to the impedance networks 66 and 70 but also to a pair of stationary contacts on a triple-pole, double-throw switch 92. This pair of contacts forms a bank with a third contact which has no electrical connections. The switch 92 also has a second bank of three stationary contacts. The stationary contact in the second bank corresponding to the unconnected contact in the first bank is connected through a resistance 94 to the combination of the resistance 44 and the potentiometer 36 in the impedance network 50.

The other two stationary contacts in the second bank of the switch 92 are in parallel with a resistance 96. The resistance 96 is in turn in series with the secondary winding 28 and with a parallel combination of a resistance 98 and a potentiometer 100. The winding 28, the resistances 96 and 98 and the potentiometer 100 form an impedance network generally indicated at 101. The movable contact associated with the unconnected stationary contact has a common terminal with the movable contact of the potentiometer 40. The other movable contacts in the switch 92 are connected to the movable contacts of a double-pole, double-throw switch 102 having two pairs of cross-connected stationary contacts.

Each pair of stationary contacts in the switch 102 is connected to the movable contacts of a switch 104. The switch 104 and a potentiometer 105 are included in an impedance network generally indicated at 106. The network 106 has various components constructed and electrically interconnected in accordance with the components in the networks 66 and 84. The characteristics of the network 106 are adapted to be measured when the plug 48 is inserted into a jack 108 corresponding in construction and electrical connections to the jack 64 associated with the network 66.

The movable contacts of the switch 104 are in parallel with the movable contacts of a switch 110. The switch 110 and a potentiometer 111 are included in an impedance network generally indicated at 112 having components corresponding in construction and electrical arrangement to the components in the networks 78 and 88. A jack 114 is electrically associated with the network 112 in a manner similar to the association of the jack 79 with the network 78.

The movable contacts of a switch 118 are connected to the potentiometer output terminals of the impedance network 80. The switch 118 is of the double-pole, double-throw type in which two pairs of stationary contacts are provided and each pair is cross connected to the other pair. The pairs of stationary contacts in the switch 118 have common terminals with the movable contacts of a switch 120. The switch 120 and a potentiometer 122 are included in an impedance network generally indicated at 124. The impedance network 124 corresponds in construction and electrical arrangement to the impedance network 106.

The movable contact of the potentiometer 122 is connected to the contact of a jack 126 corresponding to the jack 108 in the network 106. The movable contact of the potentiometer 122 is also in electrical continuity with one terminal of a resistance 132, the other terminal of which is connected to the stationary contact of a manually operated single-throw switch 130. A connection is made from the movable contact of the switch 130 to one terminal of a resistance 128, the other terminal of the resistance being connected to the movable contact of the potentiometer 105.

The movable contacts of the switch 120 are in parallel with the movable contacts of a switch 134 corresponding in construction to the switch 120. The switch 134 and a potentiometer 136 are included in an impedance network generally indicated at 138. A resistance 140, a manually operated switch 142 and a resistance 144 are in series between the movable contacts of the potentiometers 136 and 111. The switch 142 is similar in construction to the switch 130 and is ganged to the switch 130.

One terminal of the secondary winding 30 is grounded and the other terminal is connected to a grounded resistance 148. A rheostat 150, a potentiometer 152 and a rheostat 154 are in series with one another and in parallel with the parallel combination of the winding 30 and the resistance 148. The rheostat 150 corresponds in construction and value to the rheostat 154. The rheostats 150 and 154 are ganged such that the effective value of the rheostat 150 in the circuit decreases as the effective value of the rheostat 154 in the circuit increases and vice versa. The winding 30, the resistance 148, the potentiometer 152 and the rheostats 150 and 154 are included in an impedance network generally indicated at 156.

The movable contact of the potentiometer 152 is connected through a resistance 158 to a stationary contact of a single-pole, double-throw switch 160. Similarly, the grounded terminal of the rheostat 154 is connected through a resistance 162 to a stationary contact of a single-pole, double-throw switch 164. The switches 160 and 164 are such that continuity is established between the movable contact and the first stationary contact of the switch 160 at the time that no continuity is produced between the movable contact and the first stationary contact of the switch 160. The second stationary contacts of the switches 160 and 164 are connected to a pair of stationary contacts in a double-pole, double-throw switch 166 having another pair of contacts cross connected to the first pair. One movable contact of the switch 166 has a common terminal with the resistances 128 and the other movable contact has a common connection with corresponding resistances 167 and 168 respectively associated with the networks 66 and 84.

A potentiometer 170 and a resistance 172 extend electrically in a series relationship from the movable contact of the switch 164 to ground. In like manner, resistances 174 and 176 are in series with each other between the movable contact of the potentiometer 170 and the ground. A resistance 178 is connected at one end to the common terminal between the resistances 174 and 176 and at the other end is in electrical continuity with the movable contact of a potentiometer 180. The stationary contacts of the potentiometer 180 are connected between the movable contact of the switch 160 and ground.

The movable contact of the potentiometer 180 not only has a common terminal with the resistance 178 but also with a first movable contact of a jack 182 corresponding in construction to the jacks disclosed above. The first contact of the jack 182 is ganged to the movable contacts of the switches 160 and 164. The switches 160, 164 and 166, the resistances 172, 174, 176 and 178 and the potentiometers 170 and 180 are included in impedance network generally indicated at 184.

The resistance 144 associated with the impedance network 112 and corresponding resistances associated with the impedance networks 80 and 88 are connected to the movable contacts of a switch 188 corresponding to the switch 166. The switch 188 is included in an impedance network generally indicated at 190. The network 190 has various components constructed and electrically interconnected in a manner similar to the different components in the network 184.

The jacks 46, 64, 79, 82, 86, 90, 108, 114, 126 and 182 and the other jacks not specifically designated are disposed on the front panel of the computer. The jacks 64 and 79 may be aligned vertically and the jacks 64, 86, 108 and 126 may be aligned horizontally. Other similar alignments may be provided for associated jacks in the computer. Corresponding contacts of the jacks are connected to one terminal of the primary winding in a transformer 192 having its other terminal connected to a bank of resistive elements illustrated schematically as a potentiometer 193 in Figure 1.

Figure 1:
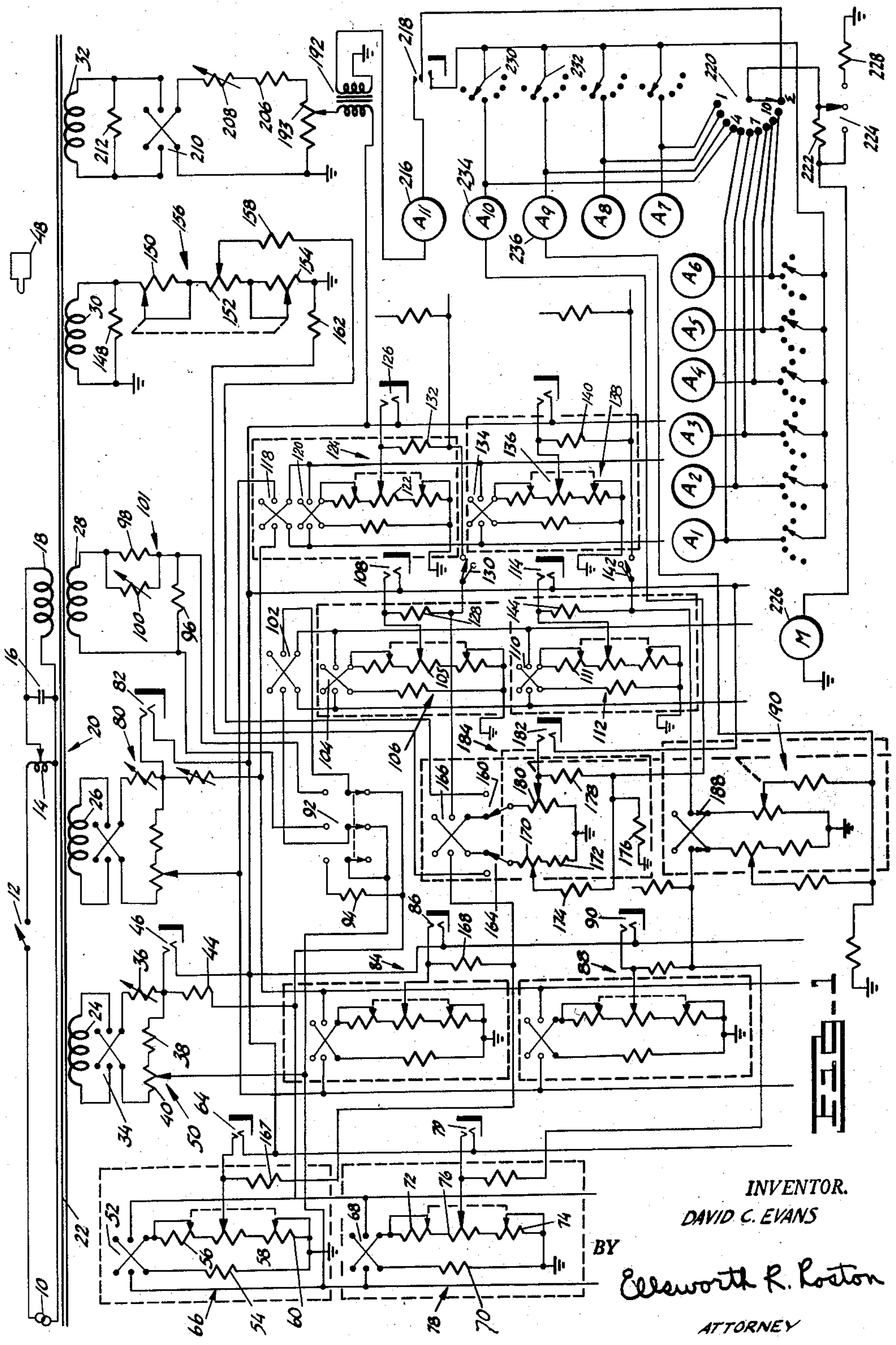
Figure 1 is a circuit diagram illustrating the construction of an analogue computer for solving a set of simultaneous linear or secular equations.

The bank of resistive elements forming the potentiometer 193 in Figure 1 includes a rheostat 194 (Figure 12), a rheostat 196, a potentiometer 198 and rheostats 200 and 202, all of which are in series with one another. One terminal of the rheostat 202 is grounded. The rheostats 194 and 202 are ganged to each other such that the effective value of the rheostat 202 increases as the effective value of the rheostat 194 decreases and vice versa. Similarly, the rheostats 196 and 200 are ganged to provide for an increase in the effective value of the rheostat 196 and simultaneously a corresponding decrease in the effective value of the rheostat 200 and vice versa.

The combined value of the rheostats 196 and 200 at any instant is substantially 10 times as great as the combined value of the rheostats 194 and 202. In like manner, the value of the potentiometer 198 between its two stationary contacts is substantially 10 times as great as the combined effective values of the rheostats 196 and 200. In this way, the total resistance from the rheostat 194 to ground remains constant and the potentiometer 198, the rheostat 196 and 200 and the rheostat 194 and 202 provide decimal indications representing the hundredths, tens and units digits in a three digit value. By arranging the potentiometer 198, the rheostats 196 and 200 and the rheostats 194 and 202 in concentric relationship on a shaft, an instantaneous indication can be provided by a vernier as to the resistance between the movable contact of the potentiometer 198 and ground.

As shown in Figure 1, the equivalent potentiometer 193 is in series with a resistance 206 and a potentiometer 208. The potentiometer 208 is in turn connected to a first stationary contact in a double-pole, double-throw switch 210 having two pairs of cross-connected second stationary contacts. The stationary contact in the switch 210 is grounded. The movable contacts of the switch 210 are connected to the parallel combination of the winding 32 and a resistance 212.

One terminal of the secondary winding in the transformer 192 is grounded, and the other terminal is connected to stages indicated in block form at 216 for amplifying and rectifying the signals from the secondary winding. The output from the stage 216 is applied to a first stationary contact of a jack 218 having a movable contact and a second stationary contact. The movable contact of the jack 218 is connected to the stationary contact of a rotary switch 220 having a plurality of stationary contacts equally spaced around a circular arc. The movable contact of the switch 220 has a common terminal with a resistance 222 and with the movable contact of a toggle switch 224 adapted upon rotation to engage any one of three stationary contacts. The resistance 222 is in series with a grounded indicator such as a meter 226. One of the stationary contacts of the toggle switch 224 is connected to a grounded resistance 228; the second stationary contact is provided with no electrical connection; and the third stationary contact is connected to the common terminal between the resistance 222 and the meter 226.

The second stationary contact of the jack 218 is connected to the movable contacts of rotary switches 230 and 232. The stationary contacts of rotary switches 230 and 232 are uniformly spaced around the periphery of a circular arc and are electrically connected to one another in a manner similar to that shown in Figure 1. The stationary contacts of the switches 230 and 232 are also respectively connected to appropriate stationary contacts in the switch 220 and to stages 234 and 236 corresponding to the stages 216.

The stages 234 receive signals from the common terminal between the resistances 176 and 178 in the impedance network 184 and the stages 236 receive signals from the corresponding terminal in the network 190. It should be appreciated that other switches corresponding to the switches 230 and 232 and other stages corresponding to the stages 234 and 236 are shown in Figure 1. The purpose of these stages will be disclosed in detail hereafter.

Figure 11:
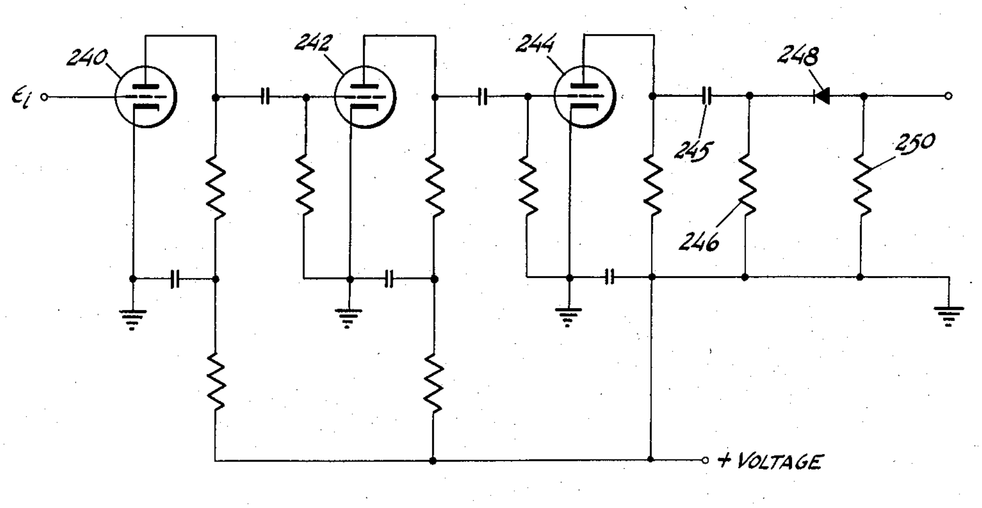
Figure 11 is a circuit diagram of certain amplifier and rectifier stages shown in block form in Figure 1.

Circuits which may be employed as the stages 234 and 236 are shown in detail in Figure 11. The circuits shown in Figure11 include a triode 240 having its cathode grounded and its grid connected to an appropriate terminal in either the network 184 or the network 190. The signals produced on the plate of the tube 240 are coupled through a suitable capacitance to the grid of a triode 242, the cathode of which is grounded. The grid of a triode 244 in turn receives the signals from the plate of the triode 242. The cathode of the triode 244 is grounded and the plate is connected through a suitable storage capacitance 245 to a grounded resistance 246 and to the plate of a suitable diode 248 such as a copper oxide rectifier. The anode of the diode 248 is connected to a grounded resistance 250 and to an output line leading to the stationary contacts of a suitable rotary switch such as the switches 230 and 232.

Figure 2:
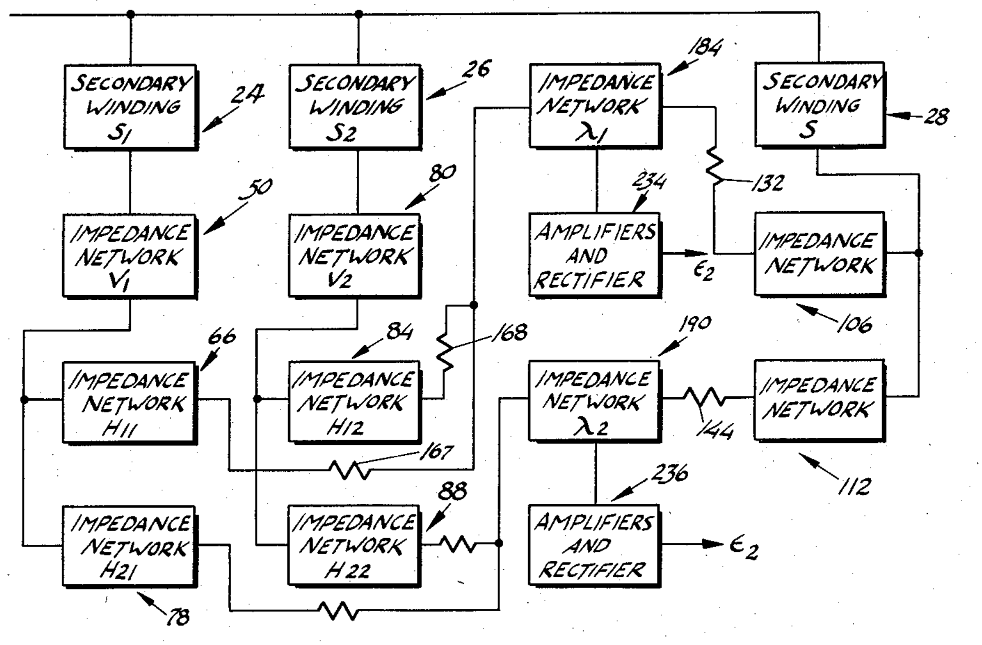
Figure 2 is a simplified block diagram illustrating the connections between the various components in Figure 1 when the computer is being utilized to solve a set of inhomogeneous equations.

The system shown in Figure 1 is adapted to solve either inhomogeneous or secular equations. A simplified block diagram is shown in Figure 2 when the system in Figure 1 is being utilized to solve inhomogeneous equations. The various stages are connected in the arrangement shown in Figure 2 by manually opening the switches 130 and 142 and by pivoting the movable contacts of the switch 92 into engagement with the upper stationary contacts shown in Figure 1. The switches 130 and 142 may be ganged to each other and to the switch 92 so that the movable contacts of the switch 92 are pivoted into engagement with the upper stationary contacts in Figure 1 as the switches 130 and 142 are manually opened. In this way, the secondary windings 24 and 26 receive alternating voltages from the source 10 and pass these voltages to the impedance networks 50 and 80, respectively. Similarly, the winding 28 receives signals from the source 10 and passes these signals to the networks 106 and 112.

The voltages produced by the networks 50 and 80 are in turn respectively applied to the networks 66 and 78 and to the networks 84 and 88. The outputs from the networks 66 and 84 respectively pass through the resistances 167 and 168 to the network 184, and the outputs from the networks 78 and 88 similarly pass through appropriate resistances to the network 190. The network 184 also receives the output voltage from the network 106 and combines these signals to produce a signal which is amplified and rectified by stages such as the stages 234 to produce an error signal. Similarly, the network 190 combines the signals from the networks 78 and 88 with the signals from the network 112 to produce an error signal which is amplified and rectified by stages such as the stages 236. The signals produced by the stages 234 and 236 represent error signals, as will be disclosed in detail hereafter.

The system shown in Figure 2 is adapted to solve the equation:

$$\Sigma_j H_{ij}V_j - \lambda b_i = 0 \qquad (1)$$

where $H_{ij}$=matrix quantities having real values of absolute magnitude less than unity;

$b_i$=matrix quantities having real values of absolute magnitude less than unity;

$\lambda$=scalar quantities having real values; and $V_j$=unknown components of a vector quantity. It should be appreciated that the above equation is shortened from the form represented by $$(H_1V_1-\lambda b_1)+(H_2V_2-\lambda b_2)+(H_3V_3-\lambda b_3)+\ldots=0 \qquad (2)$$

The system shown in Figure 1 is not only adapted to solve inhomogeneous equations but is also adapted to solve secular equations. In order to solve secular equations, the swtiches 130 and 142 in Figure 1 must be closed, and the movable contacts of the switch 92 must be pivoted from the upper stationary contacts to the lower stationary contacts. The system then has the configuration shown in Figure 3. In this configuration, the winding 24 and 26 respectively have the same relationship to the networks 50, 66 and 78 and to the networks 80, 84 and 88 as in the system shown in Figure 2.

The voltage from the network 50 is applied to the networks 106 and 112 as well as to the networks 66 and 78, and the output voltages from the networks 106 and 112 are in turn respectively introduced through appropriate resistances to the networks 184 and 190, respectively. Similarly, the voltage from the network 80 is applied to the networks 124 and 138, and the outputs from these networks. The outputs from the networks 184 and 190 are amplified and rectified by the stages 234 and 236 in a manner similar to that disclosed above and error signals are obtained from these stages.

Figure 3:
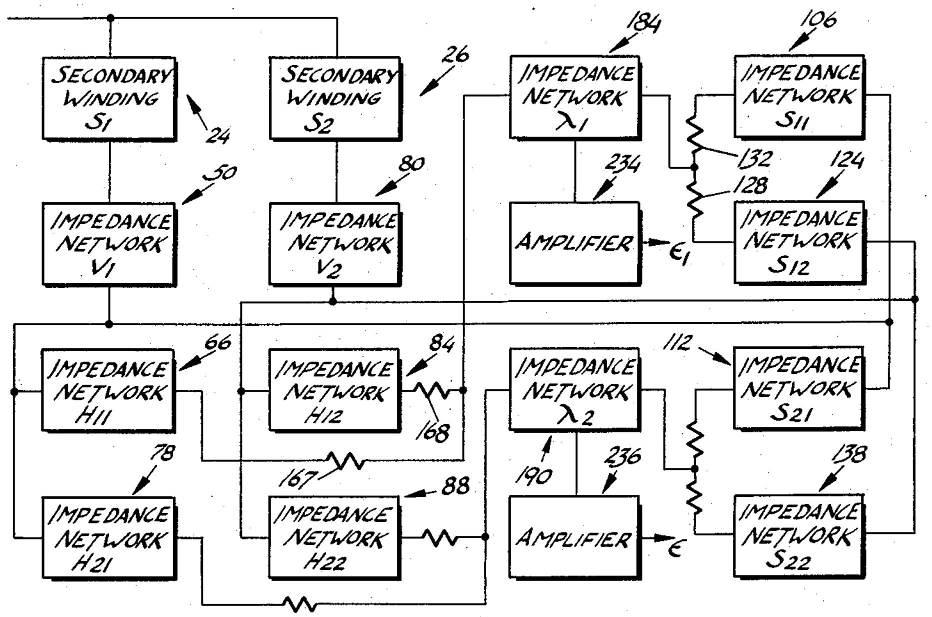
Figure 3 is a simplified block diagram of the computer when the computer is being used to solve a set of secular equations.

The system shown in Figure 3 is adapted to solve equations having the form:

$$\Sigma_j(H_{ij}-\lambda S_{ij})V_j=0 \qquad (3)$$

where $S_{ij}$=matrix quantities having real values of absolute magnitude less than unity; and The other terms have previously been defined. It will be seen that Equation 3 is actually equivalent to $$(H_1-\lambda S_1)V_1+(H_2-\lambda S_2)V_2+(H_3-\lambda S_3)V_3+\ldots=0 \qquad (4)$$

It will be seen that the networks such as the networks 50 and 80 provide indications of quantities such as $V_1$ and $V_2$ represented in Equation 3 by $V_j$. Similarly, the networks 66, 78, 84 and 88 provide indications of such quantities as $H_{11}$, $H_{21}$, $H_{12}$ and $H_{22}$ corresponding to the quantity designated as $H_{ij}$ in the above equation. In like manner, the networks 106, 112, 124 and 138 provide indications of quantities such as $S_{11}$, $S_{21}$, $S_{12}$ and $S_{22}$ corresponding to the quantity designated in general form as $S_{ij}$ in the above equation. The networks 184 and 190 provide indications of quantities designated as $\lambda$.

Figure 14:
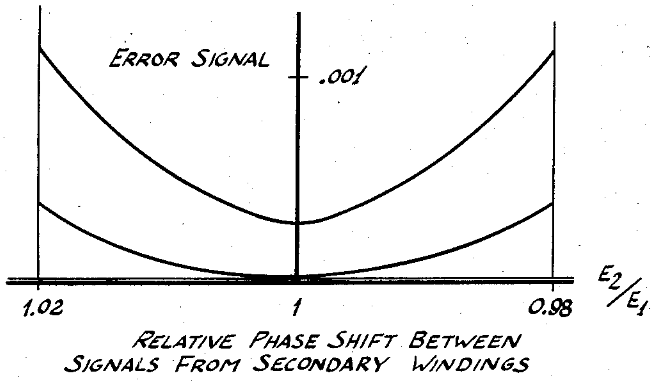
Figure 14 is a curve illustrating the criticalness in the construction and sensitivity of operation of the transformer shown in Figure 13.

Because of the particular manner in which the secondary windings of the transformer 20 are interleaved, each secondary winding is magnetically coupled to the primary winding 18 in a manner substantially equivalent to the coupling of the other winding. This causes each secondary winding to produce alternating signals which correspond substantially in phase to the signals produced by the other windings. As will be seen in Figure 14, a minimum amount of phase shift between the signals produced by the different secondary windings is necessary to prevent errors from being inherently produced in the system. It will be seen that the errors rise quickly with slight increases in the relative phase shifts of the signals produced by the different windings.

The signals produced by the winding 24 are introduced to the impedance network 50. The secondary winding 24, the impedance network 50 and the components after the impedance network 50 are shown in simplified form in Figure 4. The potentiometer 44 is not included in Figure 4 since it has a relatively low value such as a maximum value of one ohm. The components after the impedance network 50 may be satisfactorily represented by an equivalent resistance 250. In order to produce a balanced operation of the system, the impedance provided by the network 50 and the equivalent resistance 250 should equal the characteristic impedance of the network, the characteristic impedance being approximately 10 ohms.

By choosing proper values for the components after the impedance network 50, the value of the equivalent resistance 250 becomes approximately 10 ohms. The values of the potentiometers 36 and 38 are chosen to satisfy the following relationships:

$$R_1=R_L\frac{\theta-1}{\theta} \qquad (5)$$

$$R_2=R_L\frac{1}{\theta-1} \qquad (6)$$

where $R_L$=the value of the equivalent resistance 250;

$R_1$=the effective value of the potentiometer 36 in the network;

$R_2$=the effective value of the potentiometer 38 in the network; and $\theta$ represents the angular rotation of the ganged movable contacts of the potentiometers 36 and 38 and varies between a value of 1 for an initial position and a value approaching $\infty$ for a final position.

As will be seen, $R_1$ has a value of approximately 0 and $R_2$ has a value of approximately $\infty$ when $\theta=1$. This causes the circuit shown in Figure 4 to become simplified to a circuit having only the equivalent resistance 250 and the potentiometer 40 in series with the secondary winding 24. Since the potentiometer 40 has a relatively low value such as a maximum effective value of only 1 ohm, the input impedance to the network 50 is substantially balanced with the impedance presented by the network and the equivalent resistance 250.

When the movable contacts of the potentiometers 36 and 38 are adjusted to their other extreme position such that $\theta=\infty$, $R_1=R_L$ and $R_2=0$, the equivalent resistance 250 will become short circuited by the potentiometer 38. However, the impedance presented by the network 50 and the equivalent resistance 250 is still balanced with the input impedance of 10 ohms because of the effective value of 10 ohms presented by the potentiometer 36. In like manner, it can be shown that a balance in impedance is produced in the simplified circuit shown in Figure 4 for all positions of the movable contacts of the potentiometers 36 and 38.

The values of the potentiometers 36 and 38 are adjusted to attenuate the voltage induced in the winding 24 by an amount dependent upon the value of $V_1$. In this way, an output voltage equal to $V_1$ is produced across the equivalent resistance 250 if the voltage across the secondary winding 24 is considered to have a value of unity. The polarity of $V_1$ is dependent upon the positioning of the movable contacts of the switch 34 relative to the stationary contacts. When the movable contacts are pivoted into engagement with the left stationary contact shown in Figure 4 the polarity of $V_1$ is positive. Similarly, the polarity of $V_1$ is negative when the movable contacts of the switch 34 are pivoted into engagement with the right stationary contacts shown in Figure 4.

By including the potentiometer 40 and adjusting the positioning of the movable contact of the potentiometer, delicate adjustments in the value of $V_1$ can be obtained. The potentiometer 40 also serves to provide an essentially linear change in $V_1$ with variations in the value $\theta$ representing the positioning of the movable contacts of the potentiometers 36 and 38.

Figure 4:
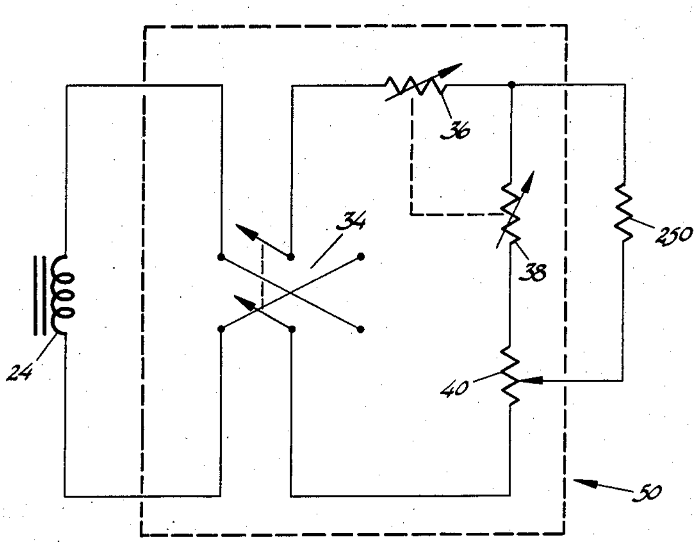
Figures 4, 5, 6, 7, 8, 9 and 10 are circuit diagrams schematically illustrating in somewhat simplified form the operation of different stages of the computer shown in Figure 1.
Figure 5:
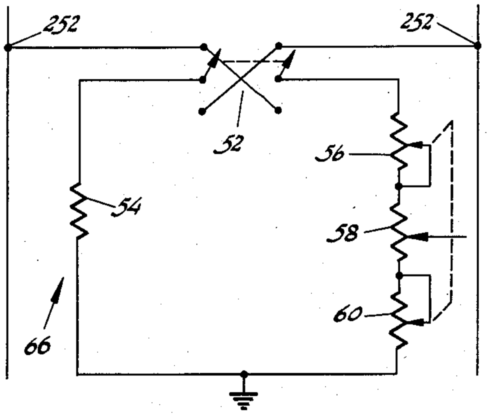

The voltage produced across the equivalent resistance 250 in Figure 4 is introduced to input terminals 252 shown in Figure 5. The voltage is then applied to the impedance network 66 shown in Figures 1 and 5. The impedance network 66 is a balanced system in that the value of the resistance 54 is equal ot the combined effective values of the rheostats 56 and 60 and the potentiometer 58. For example, the resistance 54 may have a value of approximately 103 ohms, the potentiometer 58 a value of approximately 100 ohms, and the rheostats 56 and 60 maximum values of approximately 3 ohms.

Because of the balanced values to ground of the resistance 54 and the resistive members 56, 58 and 60, one-half of the voltage between the terminals 252 is produced across the members 56, 58 and 60 and the other half of the voltage across the resistance 54.

Figure 6:
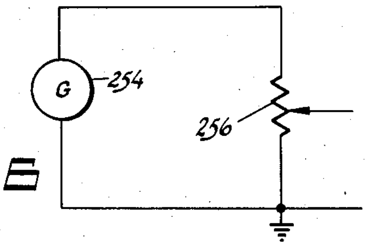

Because of the equality in the resistive values of the branches formed by the resistance 54 and by the members 56, 58 and 60, each branch receives equal voltages. Thus, the generator which may be considered to be across the terminals 252 may be divided into two equivalent generators, each of which supplies a voltage equal to that from the other generator. One of these equivalent generators is shown at 254 in Figure 6. An equivalent potentiometer 256 is shown in Figure 6 as being connected to the generator 254. This potentiometer has a resistive value equivalent to that produced by the rheostats 56 and 60 and the potentiometer 58.

The movable contact of the equivalent potentiometer 256 causes the potentiometer to be effectively divided into two parallel resistances. The maximum resistive value of this parallel combination occurs when the movable contact of the equivalent potentiometer 256 is intermediate the two stationary contacts. If the equivalent potentiometer 256 is considered to have a value of $R_7$ equal to the value of the resistance 54 in Figure 5, the two portions of the potentiometer have values of $$\frac{R_7}{2}$$

when they are both equal. Thus, the maximum value of the parallel combination formed by the potentiometer 256 is $$\frac{R_7}{4}$$

Figure 7:
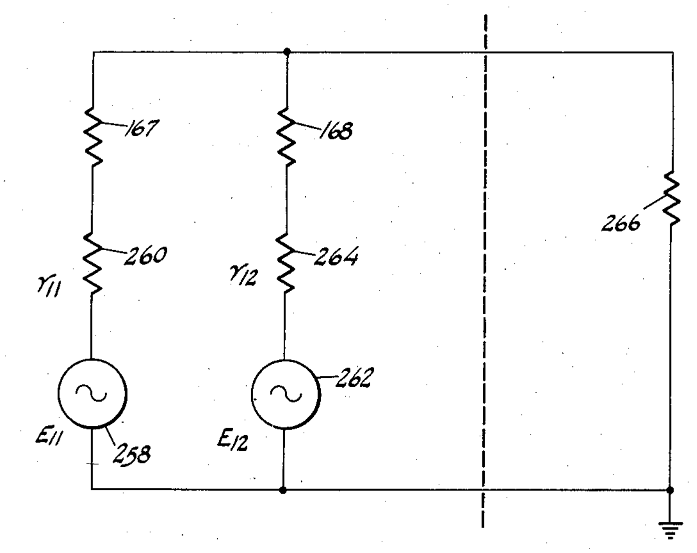

The voltage produced between the movable contact of the equivalent potentiometer 256 and ground in Figure 6 is represented by an equivalent source 258 in Figure 7. Similarly, the resistance between the movable contact of the equivalent potentiometer 256 and ground in Figure 6 is represented by an equivalent resistance 260 in Figure 7. The equivalent resistance 260 may be represented mathematically as $$0<r_{11}<\frac{R_7}{4} \qquad (7)$$

where $r_{11}$=the value of the equivalent resistance 260.

The voltage source 258 and the equivalent resistance 260 are shown as being in series with the resistance 167 also shown in Figure 1.

In like manner, the voltage and output impedance from the network 84 may be respectively represented at 262 and 264 in Figure 7. The source 262 and the equivalent resistance 264 are in series with the resistance 168, and the members 262, 264 and 168 are in turn in parallel with the members 258, 260 and 167. Both branches are in turn in series with an equivalent resistance 266, which represents the total impedance presented to the networks 184 and 84 by the components after these networks. The equivalent impedance 266 is largely produced by the network 184.

By the application of Kirchhoff's laws, the voltage across the equivalent resistance 266 is found to be $$Ea=\frac{\sum_{j=l}^{j=n}\frac{E_{ij}}{R+r_{ij}}}{\frac{1}{R_a}+\sum_{j=l}^{j=n}\frac{1}{R+r_{ij}}} \qquad (8)$$

where $E_a$=the voltage produced across the equivalent resistance 266;

$E_{ij}$=the voltages produced by the equivalent voltage sources such as the sources 258 and 262 in Figure 7;

$r_{ij}$=the values of the equivalent resistances such as the resistances 260 and 264 in Figure 7;

$R$=the values of the coupling resistances such as the resistances 167 and 168 in Figures 1 and 7;

$R_a$=the value of the equivalent resistance 266; and $n$=the number of branches in parallel with the equivalent resistance 266 in Figure 7, such as the branch formed from the members 258, 260 and 167.

As previously disclosed in Relationship 7, $$0<r_{ij}<\frac{R_7}{4}$$

Since $R_7$=103 ohms, the maximum value of $r_{ij}$ is approximately 26 ohms. By choosing a value of approximately 50,000 ohms for each of the coupling resistances such as the resistances 167 and 168, the relationship $$r_{ij} << R \qquad (9)$$

can be satisfied. Equation 8 may then be rewritten as $$E_a = \frac{R_a}{R+10R_a}\sum_{j=l}^{j=n} E_{ij} \qquad (10)$$

For the H matrix such as that represented by the network 66, $$E_{ij} = K'H_{ij}V_j \qquad (11)$$

where $V_j$=the voltage introduced to the matrix network such as the network 66 from the preceding network such as the network 50;

$H_{ij}$=the attenuation provided by the matrix network such as the network 66 upon the voltage introduced to it, the particular attenuation being dependent upon the adjustment of the impedances in the network; and $K'$=a constant determined by resistances in the circuit.

By substituting Equation 11 into Equation 10, the following relationship is obtained;

$$E_a = \frac{K'R_a}{R+10R_a}\sum_{j=l}^{j=n} H_{ij}V_j \qquad (12)$$

Since $$\frac{K'R_a}{R+10R_a}$$

is substantially a constant equal to K, Equation 12 may be simplified to $$E_a = K\sum_{j=l}^{j=n} H_{ij}V_j \qquad (13)$$

Figure 8:
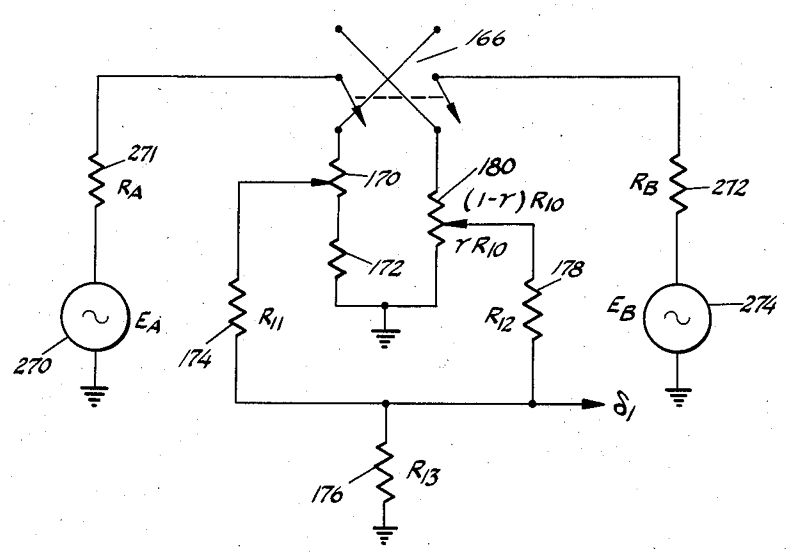
Figure 9:
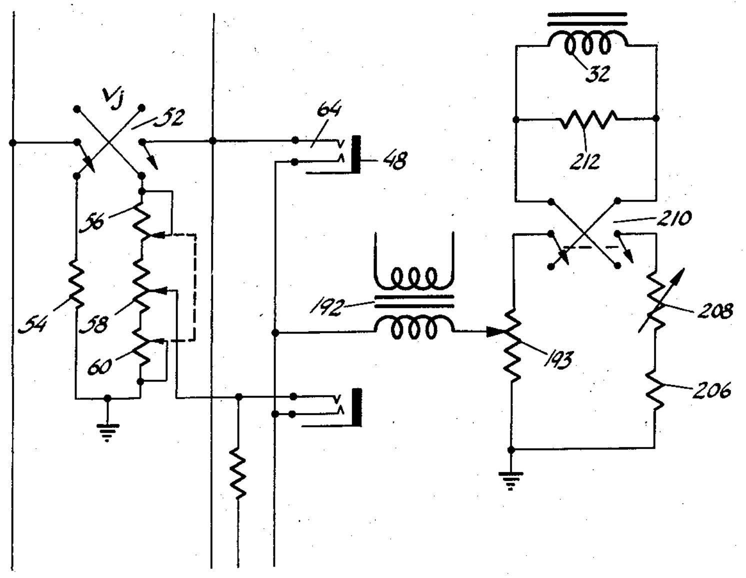
Figure 10:
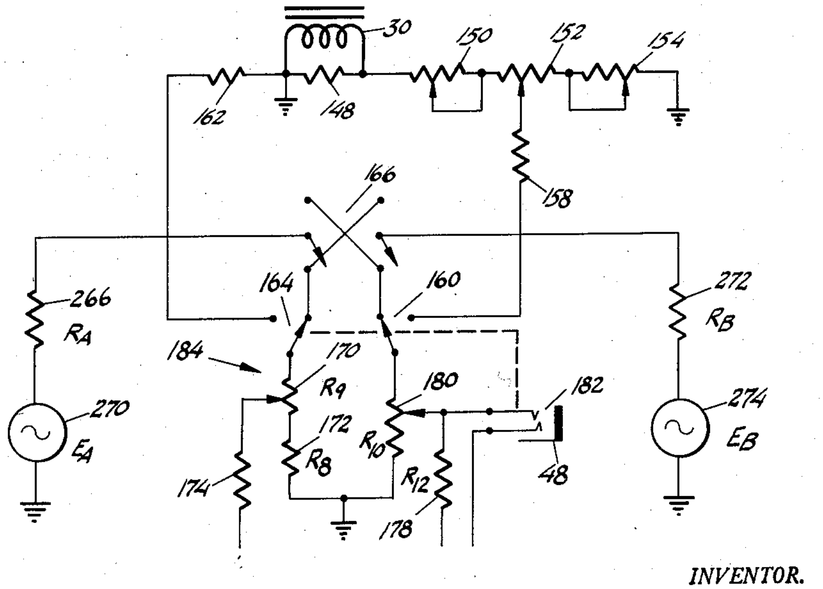

The voltage source 270 and an equivalent resistance 271 in Figure 8 represent, according to Thevenin's theorem, the circuit to the left of the broken line shown in Figure 7. In addition to the members 270 and 271, an equivalent resistance 272 and a voltage source 274 are also shown. Just as the members 270 and 271 respectively represent the input impedance and voltage introduced to the network 184 from the components to the left of the network in Figure 1, the members 272 and 274 respectively represent the input impedance and voltage introduced to the network 184 from the components to the right of the network in Figure 1.

The circuit shown in Figure 8 operates to produce across the resistance 176 an error voltage designated as $\delta_1$. This error voltage is produced when the impedances in the different networks such as the networks 50, 66, 84 and 106 in Figure 1 have not been properly adjusted to solve the particular simultaneous equations on which the computer is working. As will be seen, the purpose of the computer is to produce a minimum voltage $\delta_1$, from each of the networks such as the networks 184 and 190. In this way, the different networks produce voltages representing the different quantities in the simultaneous equations.

By the application of Kirchhoff's laws and network theorems, the error voltage ($\delta_1$ produced across the resistance 176) may be represented as:

$$S_1 = E_A\frac{R_8R_{13}}{R_A+R_8}\times\frac{R_{12}+A}{R'(R_{13}+R_{12}+A)+R_{13}(R_{12}+A)} + E_B\frac{R_{10}R_{13}R'}{R_{13}+R'}\times\frac{-\gamma}{\gamma^2-\left(\frac{1+R_B}{R_{10}}\right)\gamma-\left(\frac{1+R_B}{R_{10}}\right)\frac{R_{11}}{R_{10}}} \qquad (14)$$

where $\delta_1$=the error voltage produced across the resistance 176;

$R_8$=the combined value of the resistance 172 and the resistance of that portion of the potentiometer 170 between the movable and lower stationary contacts in Figure 8 and is approximately 10,000 ohms;

$R_{11}$=the value of the resistance 174 and is approximately 500,000 ohms;

$R_{12}$=the value of the resistance 178 and is approximately 500,000 ohms;

$R_{13}$=the value of the resistance 176 and is approximately 1,000,000 ohms;

$R_{10}$=the potentiometer 180, which is helically wound with ten turns having a total resistance of approximately 10,000 ohms;

$\gamma$=a value less than unity and is the ratio between the total number of complete and partial turns provided for the movable contact of the potentiometer 180 relative to the total number of turns in the potentiometer;

$R_A$=the value of the equivalent resistance 266 and is approximately 5,000 ohms;

$R_B$=the value of the equivalent resistance 272 and is approximately 5,000 ohms;

$$R' = R_{11} + \frac{R_AR_B}{R_A+R_B}$$

$$R'' = R_{12} + \frac{R_{13}R'}{R_{13}+R'}$$

and

A is a function of $\gamma$ and can be defined by the relationship $$0 \leqq A \leqq \frac{R_{10}+R_{12}}{4}$$

Substituting the values of the different resistances in the above equation:

$$\delta_i = K_AE_A\frac{500+A}{503.3(1500+A)+1000(500+A)} + K_BE_B\frac{-\gamma}{\gamma^2-\frac{3}{2}\gamma-125.2} \qquad (15)$$

An investigation of Equation 15 shows that by proper adjustment of $R_A$ and $R_B$ it may be simplified into the form $$\delta_i = \beta(E_A+\lambda E_B) \qquad (16)$$

where $\beta$=substantially a constant; and $0 \leqq \lambda \leqq 1$.

Thus, by adjusting the value of $\lambda$, the error signal $\delta$ may be made 0 or at least minimized. The values of the different $\lambda$'s may be adjusted by varying the positions of the movable contacts in the control potentiometers such as the potentiometer 180 in the network 184 and the corresponding potentiometer in the network 190.

The error signals produced by the networks such as the networks 184 and 190 are introduced to the stages such as the stages 234 and 236, which amplify and rectify the signals. The circuits forming the stages such as the stages 234 are shown in some detail in Figure 11. As may be seen in Figure 11, the error signal from the network 184 is introduced to the grid of the triode 240, which amplifies the signal and introduces it to the grid of the triode 242. In like manner, the triode 242 amplifies the input signal and introduces the signal to the triode 244 for amplification by this triode.

Figure 15:
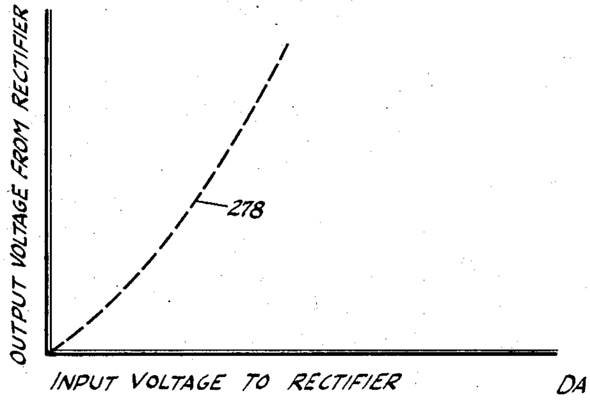
Figure 15 is a curve illustrating the operation of certain components shown in Figures 1 and 11.

The resultant signals from the triode 244 pass to the rectifier formed by the capacitance 245, the resistances 246 and 250 and the diode 248. The rectifier then operates to convert the alternating signals into a direct voltage having a positive polarity. Because of the characteristics of the diode 248, the signals produced by the rectifier increase at a rate which increases as the amplitude of the alternating signals from the triode 244 increases. This may be seen in the curve illustrated at 278 in Figure 15. In this way, the voltages produced by the rectifier across the resistance 250 have values approximating $\delta^2$. Obtaining error signals approximating $\delta^2$ is desirable since the polarity of the error signal is eliminated when $\delta$ is squared. Obtaining error signals approximating $\delta^2$ is also desirable since it causes the large error signals to become proportionately greater than the small error signals. In this way, the various impedances can be relatively easily adjusted to produce decreases in the large error signals.

The error signals produced by the stages 234 and 236 respectively pass through the switches 230 and 232 to the switch 218. The movable contacts of the switches 230 and 232 are pivoted into engagement with the appropriate stationary contact of the switches dependent upon the number of simultaneous equations to be solved. As will be seen, 10 stages corresponding to the stages 234 and 236 are shown in Figure 1. These stages receive the error voltages from networks corresponding to the networks 184 and 190. The other 8 output networks corresponding to the networks 184 and 190 and the networks such as the networks 66, 78, 106 and 112 for producing the error signals in the output networks are not shown in Figure 1 for purposes of simplification. By adjusting the rotary positions of the movable contacts in the switches 230 and 232 and the corresponding switches shown in Figure 1, a number of simultaneous equations from 2 to 10 can be solved.

When the movable contact of the switch 218 engages the lower stationary contact of the switch in Figure 1, signals pass through the switches 230 and 232 and the corresponding switches in Figure 1 to the switch 220.

When the movable contact of the switch 220 is in its extreme counterclockwise position, the meter 226 provides an indication of the composite error from each of the different output networks such as the networks 184 and 190. The composite error represents substantially an average of all of the errors in the different networks corresponding to the networks 184 and 190. By adjusting the values of the impedances in the different networks such as the networks 50 and 80 to obtain the proper values of such parameters as the different vector components $V_1$, $V_2$, etc., the indication provided by the meter 226 can be minimized. When the indication in the meter 226 is minimized, proper values are obtained for the different parameters in the set of simultaneous equations being solved.

Sometimes it is desired to provide an indication of the errors from the individual networks such as the networks 184 and 190. This is obtained by rotating the movable contact of the switch 220 in a clockwise direction from its extreme counterclockwise position. As will be seen, the different stages corresponding to the stages 234 and 236 are connected to different stationary contacts in the switch 220. Thus, upon a rotation of the movable contact of the switch 220 in a clockwise direction from its extreme counterclockwise position, the meter 226 is adapted to provide an indication of the individual errors from particular networks corresponding to the networks 184 and 190.

The meter 226 provides a sensitivity of response dependent upon the positioning of the movable contact of the switch 224. With the movable contact of the switch 224 positioned to engage the right stationary contact in Figure 1, the resistance 228 is in parallel with the series branch of the resistance 222 and the meter 226. Since the resistance 228 has a value of approximately 470 ohms and the resistance 222 has a value of approximately 27,000 ohms, the sensitivity of the meter 226 is relatively low.

Upon an engagement between the movable contact and the intermediate stationary contact of the switch 224, the meter 226 has a moderate sensitivity. The meter 226 has only a moderate sensitivity since the resistance 222 is still in series with the meter 226. When the movable contact of the switch 224 engages the left stationary contact in Figure 1, the meter 226 has a relatively high sensitivity since the resistance 222 is now shorted out of the circuit.

To place the system shown in Figure 1 into operation, the switch 12 is manually closed. If a set of inhomogeneous equations is to be solved, the switches 130 and 142 are opened and the movable contacts of the switch 92 are pivoted into engagement with the upper stationary contacts in Figure 1. In this way, the system shown in Figure 2 is obtained. For the solution of secular equations, the switches 130 and 142 are closed and the movable contacts of the switch 92 are pivoted into engagement with the lower stationary contacts in Figure 1. By operating the switches 130, 142 and 92 as disclosed in the previous sentence, the system shown in Figure 3 is obtained.

Regardless of whether the computer is to be used for the solution of secular or inhomogeneous equations, the switches 130 and 142 are initially closed during the time that the various impedances are being adjusted to the proper values representing the different parameters in the set of simultaneous equations. During this time the movable contact of the autotransformer 14 is adjusted to provide for the introduction of a maximum voltage to the primary winding 18. The L-pads such as that formed by the potentiometers 36 and 38 are then adjusted to provide a 0 value of resistance for the potentiometer 36 and a large value of resistance for the potentiometer 38. The movable contact of the potentiometer 40 is also adjusted to an intermediate position on the potentiometer.

Figure 12:
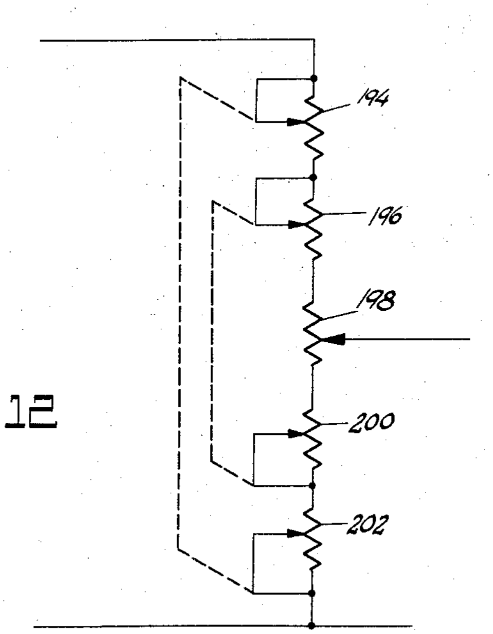
Figure 12 is a circuit diagram illustrating in further detail certain components shown somewhat schematically in Figure 1.

The movable contacts of the potentiometer 198 and the rheostats 194, 196, 200 and 202 in Figure 12 are adjusted to provide a reading of 1.000 on the vernier associated with these resistive members. The plug 48 is then inserted into the jack 46 to establish electrical continuity between the movable and stationary contacts of the jack. This causes a continuous circuit to be established which includes the common terminal between the potentiometers 36 and 38, the switch 46, the primary winding of the transformer 192 and the resistive members shown in Figure 12 and represented by the equivalent potentiometer 193 in Figure 1. Because of this continuous circuit, an alternating voltage is introduced from the secondary winding 24 to the equivalent potentiometer 193. This voltage is in opposition to the voltage introduced from the secondary winding 32 through the resistive members 208 and 206 to the equivalent potentiometer 193.

By adjusting the position of the movable contact of the potentiometer 208 to vary the effective value of the potentiometer in the circuit, the voltage introduced to the potentiometer 193 from the winding 32 can be made equal to the voltage introduced to the potentiometer from the winding 24. This causes a 0 value of voltage to be produced in the primary winding of the transformer 192, such that no voltage is induced in the secondary winding. When the movable contact of the switch 218 engages the upper stationary contact in Figure 1, a continuous circuit is established which includes the secondary winding of the transformer 192, the stages 216, the switch 218, the switch 220 and the meter 226. The circuit is of course established only when the movable contact of the switch 220 has been rotated in a counter clockwise direction to engage the extreme stationary contact on the switch. Since no voltage is induced in the secondary winding of the transformer 192 the meter 226 provides a 0 indication. In this way, the potentiometer 208 provides an adjustment to produce a calibration of 1.000 on the equivalent potentiometer 193 for a particular setting of the potentiometers 36, 38 and 40.

After the potentiometer 208 has been adjusted to provide a calibration of 1.000 for a particular setting of the potentiometers 36, 38 and 40, the potentiometers in the network 80 corresponding to the potentiometers 36, 38 and 40 are adjusted in a manner similar to the adjustment of the potentiometers 36, 38 and 40. The plug 48 is then inserted into the jack 82 to provide a continuous circuit from the winding 26 to the equivalent potentiometer 193. The potentiometer in the network 50 is subsequently adjusted to provide a 0 indication in the meter 226. In this way, the network 80 is initially adjusted to provide a voltage of unity. Corresponding adjustments are made in networks corresponding to the network 80 when the system shown in Figure 1 is being utilized to solve a set of simultaneous equations which include a greater number of equations than 2.

It has been disclosed previously that the matrix quantities such as the $H_{ij}$ and $S_{ij}$ quantities are known for a set of simultaneous equations. These quantities are represented by networks such as the networks 66 and 78 and by networks such as the networks 106 and 112 in Figure 1. In order to adjust these networks to their proper values, the networks such as the networks 50 and 80 must first be adjusted to provide voltages representing values of unity. The movable contact of the equivalent potentiometer 193 in Figure 1 is then adjusted to provide an indication on the vernier of the particular value representing the matrix quantities. For example, when a particular matrix quantity has a value of 0.755, the movable contact of the equivalent potentiometer 193 is adjusted to provide a reading of 0.755.

Upon the proper adjustment of the movable contact of the equivalent potentiometer 193, the plug 48 is inserted into appropriate jack. For example, if the network 66 is to be provided with a value of 0.755, the plug 48 is inserted into the jack 64. This causes a continuous circuit to be established from the movable contact of the potentiometer through the switch 64 and the primary winding of the transformer 192 to the equivalent potentiometer 193. By adjusting the positions of the movable contacts in the potentiometer 58 and the rheostats 56 and 60, the voltage introduced from the network 66 to the movable contact of the potentiometer becomes substantially equal to the voltage produced on the movable contact of the potentiometer by the winding 32. A 0 value of voltage is thus produced in the winding 192, and a 0 indication is provided in the meter 226. Upon such an indication, the network 66 provides the proper value, such as 0.755.

The other networks representing matrix quantities are set to their proper value in a manner similar to that disclosed above. If certain networks should not be required for use in the solution of a set of simultaneous equations, the values represented by these networks are adjusted to 0. For example, a comparison of Figures 2 and 3 will show that the networks 124 and 138 are not required for use in solving a set of two simultaneous inhomogeneous equations. The values represented by the networks 124 and 138 are set to 0 by adjusting the positions of the movable contacts in the potentiometer 56 and the rheostat 58 to provide a 0 voltage between the movable contact of the potentiometer 58 and ground.

An initial calibration must be provided for the networks such as the networks 184 and 190 as well as for the networks such as the networks 50 and 80. As a first step in calibrating the $\lambda$ networks corresponding to the networks 184 and 190, the network 80 is retained at a value of 1.000, and the other $V_j$ networks including the network 50 are adjusted to provide a value of 0. The $V_j$ networks other than the network 80 are adjusted to a value of 0 by rotating the movable contacts of the potentiometers 36 and 38 to provide a maximum effective value for the potentiometer 36 and an effective value of 0 for the potentiometer 38. Since the equivalent resistance 250 in Figure 4 is in parallel with the potentiometer 38, a potential of 0 volts is produced across the resistance 250 to represent the output voltage from the potentiometer.

After the different $V_j$ networks have been adjusted to their proper values, an associated pair of $H_{ij}$ and $S_{ij}$ networks are adjusted to the same value. For example, when the $\lambda$ network 184 is to be calibrated, the networks 84 and 120 may be both adjusted to provide values of 0.832. The networks 84 and 120 are adjusted to the same value since an examination of Equation 3 shows that $\lambda=1$ when $H_{ij}$ and $S_{ij}$ are equal. The movable contact of the potentiometer 180 is then adjusted to provide almost a maximum value of resistance between the movable contact of the potentiometer and ground.

As the next steps, the movable contacts of the switches 102 and 166 are pivoted into engagement with the lower stationary contacts in Figure 1. The movable contacts of the switch 102 are pivoted into engagement with the lower stationary contacts to make the polarity of $\lambda$ positive. The movable contacts of the switch 166 are pivoted into engagement with the lower stationary contacts for reasons which will be disclosed in detail hereafter.

Upon the proper setting of the switches 102 and 166, the plug 48 is inserted into the jack 218. The movable contact of the switch 220 is then rotated to the proper stationary contact for establishing a continuous circuit from the stages 234 through the switch. This causes the voltage across the resistance 176 to be indicated by the meter 226. By adjusting the positioning of the movable contact in the potentiometer 170, the voltage across the resistance 176 can be made substantially 0. In this way, the voltage on the movable contact of the potentiometer 170 is balanced with the voltage on the movable contact of the potentiometer 180 to conform with the balanced characteristics of the networks 84 and 120. After the movable contact of the potentiometer 170 has been initially adjusted in position to produce a potential of 0 volt across the resistance 176, the position of the movable contact on the potentiometer 170 is thereafter maintained constant.

In order to provide a check for the proper positioning of the movable contact on the potentiometer 170, the movable contacts of the switch 166 are pivoted from engagement with the lower stationary contacts into engagement with the upper stationary contacts. Because of the cross connections between each pair of stationary contacts in the switch 164, the network 184 operates to provide the inverse of its previous indications when the movable contacts of the switch 166 are pivoted from the lower to the upper stationary contacts. Since the characteristics of the network 184 are initially varied by adjusting the position of the movable contact in the potentiometer 170 to provide an indication of $\lambda=1$, the network should now provide an indication of $$\frac{1}{\lambda}=1$$

Thus an output indication of 0 should be provided by the meter 226 when the movable contacts of the switch 166 engage either the lower or upper stationary contacts, provided that the potentiometer 170 has been properly adjusted to make $\lambda=1$.

After the movable contact of the potentiometer 170 has been properly adjusted, the plug 48 is removed from the jack 218 and inserted into the jack 182. Since the switches 160 and 164 are ganged to one of the contacts in the jack 182, the movable contact of the switch 160 engages its right stationary contact upon insertion of the plug 48, and the movable contact of the switch 164 engages its left stationary contact. This causes a continuous circuit to be established including the winding 30, the rheostat 150, the potentiometer 152, the resistance 158, the right stationary and movable contacts of the switch 160 and the potentiometer 180.

The continuous circuit from the winding 30 through the potentiometer 180 produces on the movable contact of the potentiometer a voltage dependent upon the positioning of the movable contacts in the rheostats 150 and 154 and in the potentiometer 152. By properly adjusting the movable contacts of these respective members, the voltage produced by the winding 30 on the movable contact of the equivalent potentiometer 193 is made substantially equal to the voltage produced by the winding 32 on the movable contact of the equivalent potentiometer. In this way, the network 156 is adjusted to provide a reference voltage for a value of $\lambda=1$. This voltage is equal to that produced by the winding 32 between the movable contact of the equivalent potentiometer 193 and ground when the contact has been adjusted to provide an indication of 1.000 on its associated vernier.

After all of the $\lambda$ networks have been calibrated and the networks such as the network 50 have been adjusted to indicate the proper matrix values in the set of simultaneous equations undergoing solution, actual computation is initiated. The computation is initiated by inserting the plug 48 into the jack 218 and by rotating the movable contact of the switch 220 in the counterclockwise direction to its extreme stationary contact. The switches corresponding to the switches 230 and 232 are set to the proper stationary contact dependent upon the number of simultaneous equations in the set. For example, the movable contacts of the switches would be rotated in a counterclockwise direction to the extreme stationary contacts when the set of simultaneous equations equals 10. The movable contact of the switch 224 is also adjusted in position so as to engage the right stationary contact in Figure 1. As previously disclosed, this causes the meter 226 to have a relatively low sensitivity.

In addition to setting the switch 224 to provide a low sensitivity for the meter 226, the movable contact of the autotransformer 14 is adjusted in position to provide a relatively low voltage for introduction to the primary winding 18 of the transformer 22. As a result of these two operations, the system shown in Figure 1 cannot become overloaded in case the $V_j$ network corresponding to the networks 50 and 80 are initially considerably unbalanced from their proper values. The switch 92 and the switches such as the switches 130 and 142 are adjusted as disclosed above to provide for the solution of either inhomogeneous or secular equations.

The necessary number of $V_j$ networks corresponding to the networks 50 and 80 are initially adjusted to provide maximum voltages and the other $V_j$ networks are adjusted to provide zero voltages. For example, if there are 8 equations in the set of simultaneous equations to be solved, 8 of the $V_j$ networks corresponding to the networks 50 and 80 would be adjusted to provide maximum voltages and the other two networks would be adjusted to provide zero voltages.

Upon the performance of the previous steps, the impedance in the $V_j$ networks corresponding to the networks 50 and 80 are adjusted to provide voltages corresponding to the values of $V_j$. The $\lambda$ networks corresponding to the networks 184 and 190 are also adjusted to provide proper values for the different $\lambda$'s. As the adjustments proceed so that the errors become minimized, the movable contact of the autotransformer 14 is adjusted in position to increase the voltage introduced to the primary winding 18. The movable contact of the switch 224 is also pivoted first to the intermediate stationary contact and subsequently to the left stationary contact in Figure 1 to increase the sensitivity of the meter 226. The balancing of the different networks continues until the error signal produced by the different $\lambda$ networks corresponding to the networks 184 and 190 becomes sufficiently minimized.

Because of the inherent construction and operation of the system and because of the conversion of the error signals into signals proportional to $\delta^2$, the adjustments of the different networks provide convergent values. By "convergent" values is meant that each network can be adjusted sequentially to reduce the composite error signal $\delta^2$ towards 0. In this way, proper values can be obtained for the different networks in a minimum amount of time.

After the proper values have been obtained for each network, the unknown values such as the values of $V_j$ and $\lambda$ are measured. As a preliminary step, the movable contact of the switch 224 is pivoted into engagement with the right stationary contact in Figure 1 to dull the sensitivity of the meter 226. However, the movable contact of the autotransformer 14 is maintained at a position to provide for the introduction of a maximum voltage to the primary winding 18. The plug 48 is then inserted into the jack associated with the network to be measured. For example, if the characteristics of the network 50 are to be determined, the plug 48 is inserted into the jack 46.

The insertion of the plug 48 into the jack 46 causes a voltage to be produced in the jack 46 dependent upon the adjustment of the potentiometers 36, 38 and 40. The voltage in the jack 46 is introduced through the primary winding of the transformer 192 to the movable contact of the equivalent potentiometer 193 in Figure 1. By adjusting the movable contact of the potentiometer 193, the voltage introduced to the movable contact from the winding 32 can be made substantially equal to the voltage introduced to the movable contact from the network 50.

Since the voltages from the winding 32 and the network 50 oppose each other at the movable contact of the equivalent potentiometer 193, no voltage is induced in the secondary winding of the transformer 192 and a minimum indication is produced in the meter 226. In this way, the movable contact of the equivalent potentiometer 193 provides an indication of the voltage from the network 50 representing the value of $V_1$ for the network. In like manner, the movable contact of the equivalent potentiometer 193 can be adjusted to provide indications of the values of the different unknown quantities in the set of simultaneous equations.

The switches corresponding to the switch 52 in the network 66 determine the polarity of the quantity represented by the network. For example, the polarity of $H_{11}$ is positive when the movable contacts of the switch 66 are pivoted into engagement with the lower stationary contacts in Figure 1. In like manner, the polarity of $H_{11}$ is negative upon an engagement between the movable contact of the switch 52 and the upper stationary contacts in Figure 1. This results from the cross connections between the lower and upper stationary contacts in Figure 1.

When the value of $\lambda$ for the networks corresponding to the networks 184 and 190 is to be measured, the plug 48 is inserted into the jack 182. Since the movable contact of the switch 160 is ganged to one of the contacts in the jack 182, the movable contact of the switch 160 engages its right stationary contact in Figure 1. This causes a continuous circuit to be established which includes the winding 30, the rheostat 150, the potentiometer 152, the resistance 158, the switch 160, the potentiometer 180, the switch 182, the primary winding of the transformer 192 and the equivalent potentiometer 193.

Since the voltage from the network 156 has been previously adjusted as disclosed above to provide a value equal to unity, the attenuation produced in the network 184 represents the value of $\lambda$. By adjusting the movable contact of the equivalent potentiometer 193, the voltage introduced to the movable contact from the winding 32 can be made equal to the voltage introduced to the movable contact of the potentiometer 193 from the movable contact of the potentiometer 180. Under such a set of conditions, the reading provided by the vernier associated with the movable contact of the potentiometer 193 provides an indication of $\lambda$ for the network 184. This value of $\lambda$ is equal to the value of $\lambda$ for the other networks corresponding to the network 184 since the values of $\lambda$ for the different networks are equal.

It should be appreciated that only a single value can be obtained for $\lambda$ in a set of secular equations. Thus, the value of $\lambda$ can be measured directly from the position of the movable contact in the potentiometer 180. In inhomogeneous equations, a plurality of values can be obtained for $\lambda$. Because of this, the different values for $\lambda$ must be determined from the measured values of $V_j$ and the known values of $H_{ij}$ and $b_{ij}$.

When the value of $\lambda$ is less than unity for a particular network corresponding to the networks 184 and 190, the movable contact of the switch corresponding to the switches 166 and 188 is pivoted into engagement with the lower stationary contacts in Figure 1. This causes the system shown in Figure 1 to provide a solution of simultaneous equations in the form shown in either Equation 1 or 3. For values of $\lambda$ greater than unity, the movable contacts of the particular switch corresponding to the switches 166 and 188 are pivoted into engagement with the upper stationary contacts in Figure 1. This causes the simultaneous equations such as those having the form shown in Equation 1 to be replaced by equations having the form.

$$\sum_j \mu H_{ij} V_j - \lambda b_i = 0$$

where $\mu$=a scalar quantity having values less than unity; and the other terms have previously been defined.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. Apparatus for solving simultaneous linear and secular equations having matrix, scalar and unknown quantities comprising: a transformer adapted to be energized, said transformer having a plurality of interleaved windings, each of said windings being connected to a substantially constant impedance circuit, said substantially constant impedance circuit for supplying different values of potential, means for providing a first plurality of networks having adjustable impedances to produce voltages representing the different unknown quantities in the equations, means for providing a second plurality of networks having adjustable impedances to produce voltages representing the different scalar quantities in the equations, means for providing at least a third plurality of networks representing different matrix elements in the equations, coupling means for coupling said different values of potential to certain of said networks, the different networks in the first, second and third pluralities interconnected in accordance with the equations to be solved, means for providing an indication of the error resulting from incorrect adjustments of impedances in the different networks, the different impedances being adjusted to minimize the error indications, and means for determining the values of the different quantities in the equations in accordance with the values of the impedances in the different networks.

2. Apparatus for solving simultaneous linear and secular equations having matrix, scalar and unknown quantities, including, a transformer adapted to be energized, said transformer having a plurality of interleaved windings, said plurality of interleaved windings for deriving a plurality of substantially like-phase alternating voltages, a first plurality of networks having adjustable impedances to represent the unknown quantities in the equation, means for introducing like-phase alternating voltages to the first plurality of networks, a second plurality of networks having adjustable impedances to represent certain matrix quantities in the equations, means for introducing the alternating voltages from the first plurality of networks to the second plurality of networks, a third plurality of networks having adjustable impedances to represent other matrix quantities in the equations, means for introducing to the third plurality of networks said like-phase alternating voltages for the solution of first equations and the alternating voltages from the first plurality of networks for the solution of second equations, a fourth plurality of networks having adjustable impedances to represent the scalar quantities in the equations, means for introducing the alternating voltages from the second and third pluralities of networks to the fourth plurality of networks, different impedances in the first, second, third and fourth pluralities of networks being adjusted to minimize the signals from the fourth plurality of networks, and means for determining the values of the different quantities in the equations in accordance with the adjusted values of the impedances in the different networks.

3. Apparatus for solving simultaneous linear and secular equations having matrix, scalar and unknown quantities, including, a transformer adapted to be energized, said transformer having a plurality of substantially in phase interleaved secondary windings, said secondary windings for deriving a plurality of alternating voltages, means for providing impedance networks representing the matrix quantities, means for providing impedance networks representing the scalar quantities, means for providing impedance networks representing the unknown quantities, means for providing interconnections between the impedance networks representing the matrix, scalar and unknown quantities in accordance with the equations to be solved, means for introducing certain of said alternating voltages to the different networks, means for adjusting the values of the impedances in the different networks in accordance with the values in the equation to be solved to produce the proper voltage from each network for introduction to the next network, and means for determining the values of the different quantities in the equations in accordance with the values of the impedances in the different networks.

4. A device according to claim 1 wherein said substantially constant impedance circuit comprises variable resistance components interconnected such that variations between said variable resistance components are mutually compensating.

5. Apparatus for solving simultaneous linear and secular equations having matrix, scalar, and unknown quantities including: a transformer adapted to be energized, said transformer having a plurality of interleaved secondary windings; a like plurality of substantially constant-impedance circuits individually coupled to said secondary winding such as to derive a plurality of substantially in phase alternating voltages; means for providing impedance networks representing the matrix quantities; means for providing impedance networks representing the scalar quantities; means for providing impedance networks representing the unknown quantities; means for providing interconnections between the impedance networks representing the matrix, scalar, and unknown quantities, in accordance with the equations to be solved; means for introducing certain of said alternating voltages to the different networks; means for adjusting the values of the impedances in the different networks in accordance with the values in the equation to be solved, to produce the proper voltage from each network for introduction to the next network; and means for determining the values of the different quantities in the equations in accordance with the values of the impedances in the different networks.

References Cited in the file of this patent

UNITED STATES PATENTS

| | | |
|---|---|---|
| 1,916,187 | Read | June 27, 1933 |
| 2,454,549 | Brown et al. | Nov. 23, 1948 |
| 2,455,974 | Brown | Dec. 14, 1948 |
| 2,525,124 | Gallaway et al. | Oct. 10, 1950 |
| 2,543,650 | Walker | Feb. 27, 1951 |
| 2,613,032 | Serrell et al. | Oct. 7, 1952 |